(12) United States Patent
Jung et al.

(10) Patent No.: US 11,897,520 B2
(45) Date of Patent: Feb. 13, 2024

(54) METHOD FOR TRANSFERRING VEHICLE CONTROL FROM AUTOMATED VEHICLE CONTROL TO MANUAL VEHICLE CONTROL

(71) Applicant: ZF Friedrichshafen AG, Friedrichshafen (DE)

(72) Inventors: Steffen Jung, Hemmingen (DE); Andreas Kramme, Friedrichshafen (DE); Maximilian Haverkamp, Friedrichshafen (DE); Jan Bavendiek, Roetgen (DE); Lutz Eckstein, Aachen (DE); Alexander Tenbrock, Aachen (DE); Gert-Dieter Tuzar, Minfeld (DE); Markus Uhlig, Stuttgart (DE); Thomas Sulzbach, Cologne (DE)

(73) Assignees: ZF Friedrichshafen AG, Friedrichshafen (DE); Faurecia Innenraum Systeme GmbH, Hagenbach (DE)

( * ) Notice: Subject to any disclaimer, the term of this patent is extended or adjusted under 35 U.S.C. 154(b) by 528 days.

(21) Appl. No.: 17/271,806

(22) PCT Filed: Aug. 12, 2019

(86) PCT No.: PCT/EP2019/071554
§ 371 (c)(1),
(2) Date: Feb. 26, 2021

(87) PCT Pub. No.: WO2020/064200
PCT Pub. Date: Apr. 2, 2020

(65) Prior Publication Data
US 2021/0316764 A1 Oct. 14, 2021

(30) Foreign Application Priority Data

Sep. 24, 2018 (DE) .................... 10 2018 007 506.1

(51) Int. Cl.
*B60W 60/00* (2020.01)
*B60K 26/02* (2006.01)
(Continued)

(52) U.S. Cl.
CPC ......... *B60W 60/0053* (2020.02); *B60K 26/02* (2013.01); *B60K 35/00* (2013.01);
(Continued)

(58) Field of Classification Search
CPC ............. B60W 60/0053; B60W 50/16; B60W 2050/143; B60W 2050/146;
(Continued)

(56) References Cited

U.S. PATENT DOCUMENTS

2015/0151786 A1* 6/2015 Fujii ..................... B62D 6/008
701/41
2017/0293306 A1 10/2017 Riefe et al.

FOREIGN PATENT DOCUMENTS

DE 10 2012 219 924 4/2014
DE 10 2014 208 350 11/2015
(Continued)

OTHER PUBLICATIONS

Search Report issued in German Patent Application No. DE 10 2018 007 506.1 dated Jul. 12, 2019 (10 pages).
(Continued)

*Primary Examiner* — Michael V Kerrigan
(74) *Attorney, Agent, or Firm* — Crowell & Moring LLP

(57) ABSTRACT

A method for transferring control of a vehicle from automated vehicle control by a control unit to manual vehicle control by a driver by a control lever, wherein the control lever is used at least to accelerate, brake, and steer the vehicle, wherein there is also at least one first display screen for displaying driving information, including at least an actual speed and an actual trajectory of the vehicle and a (Continued)

Figure 1:
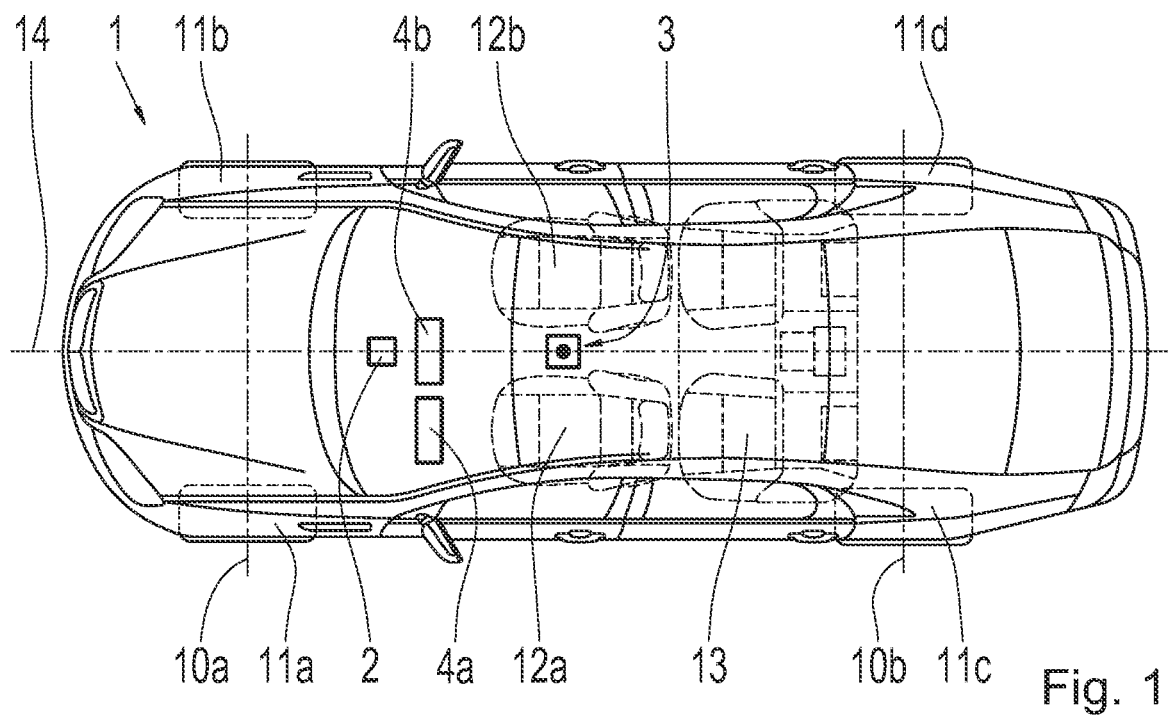

speed and a trajectory based on the actual position of the control lever, and wherein automated vehicle control is transferred to manual vehicle control when the actual speed of the vehicle corresponds graphically to the speed based on the actual position of the control lever and the actual trajectory of the vehicle corresponds graphically to the trajectory based on the actual position of the control lever on the first display screen.

20 Claims, 2 Drawing Sheets

(51) Int. Cl.
*B60K 35/00* (2006.01)
*B60T 7/08* (2006.01)
*B60W 50/16* (2020.01)
*B62D 1/12* (2006.01)
*G05D 1/00* (2006.01)
*B60W 50/14* (2020.01)

(52) U.S. Cl.
CPC ............. *B60T 7/08* (2013.01); *B60W 50/16* (2013.01); *B62D 1/12* (2013.01); *G05D 1/0061* (2013.01); *B60K 2370/135* (2019.05); *B60K 2370/166* (2019.05); *B60K 2370/167* (2019.05); *B60K 2370/175* (2019.05); *B60W 2050/143* (2013.01); *B60W 2050/146* (2013.01); *B60W 2540/21* (2020.02)

(58) Field of Classification Search
CPC ....... B60W 2540/21; B60W 2540/215; B60W 50/14; B60K 26/02; B60K 35/00; B60K 2370/135; B60K 2370/166; B60K 2370/167; B60K 2370/175; B60K 2370/1438; B60T 7/08; B62D 1/12; G05D 1/0061; G05D 1/0088
See application file for complete search history.

(56) References Cited

FOREIGN PATENT DOCUMENTS

| | | |
|---|---|---|
| DE | 10 2015 209 137 | 11/2016 |
| DE | 10 2016 203 398 | 9/2017 |
| DE | 10 2016 211 468 | 12/2017 |
| DE | 10 2018 007 506 A1 | 3/2020 |
| EP | 2862767 | 9/2014 |
| EP | 3037315 | 6/2016 |
| FR | 3063958 | 9/2018 |
| WO | WO 2020/064200 A1 | 4/2020 |

OTHER PUBLICATIONS

International Search Report (with English Translation) and Written Opinion from PCT/EP2019/071554 dated Oct. 17, 2019 (12 pages).

* cited by examiner

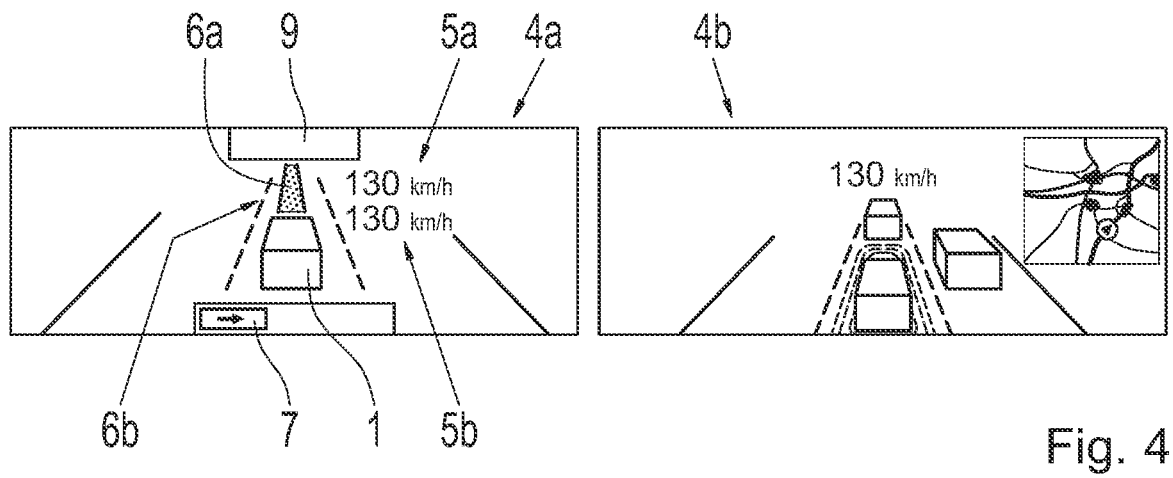
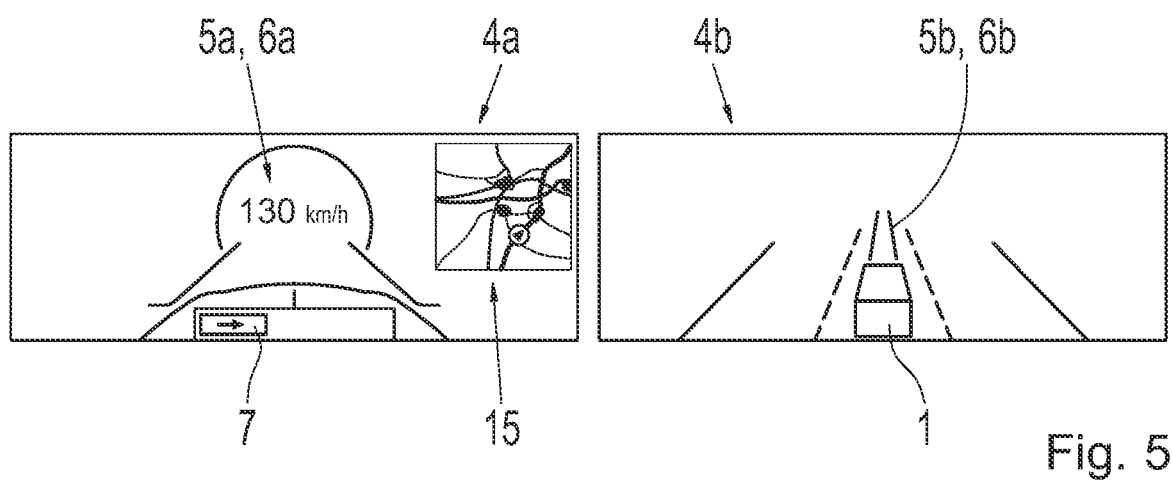

METHOD FOR TRANSFERRING VEHICLE CONTROL FROM AUTOMATED VEHICLE CONTROL TO MANUAL VEHICLE CONTROL

CROSS-REFERENCE TO RELATED APPLICATIONS

This application is a U.S. national stage application under 35 U.S.C. § 371 of PCT Application No. PCT/EP2019/071554 filed on Aug. 12, 2019, and published as WO 2020/064200 A1 on Apr. 2, 2020, which claims priority from German Application No. DE 10 2018 007 506.1, filed on Sep. 24, 2018, the entirety of which are each hereby fully incorporated by reference herein.

The invention relates to a method for transferring vehicle control in a vehicle from automated vehicle control by a control unit to manual vehicle control by a vehicle driver by means of a manually operable control lever, wherein the control lever is used to at least accelerate, brake and steer the vehicle.

By way of example, DE 10 2012 219 924 A1 discloses a vehicle assistance device comprising a control unit for controlling information display, a display screen for displaying information, a position determination device for determining the position of the vehicle, at least one sensor for determining a state of a vehicle, a storage device that has a first memory for storing states of the vehicle, and a second memory for storing positions. The control unit is configured to compare the determined state of the vehicle with the states of the vehicle stored in the first memory, and compare the determined position of the vehicle with the positions of the vehicle stored in the second memory. The control unit is also configured to display the information on the display screen if it determines that the state of the vehicle is the same as a state stored in the first memory, and/or the position of the vehicle is the same as a position stored in the second memory.

The fundamental object of the invention is to create a method for transferring vehicle control from automated vehicle control by a control unit to manual vehicle control by a vehicle driver by means of a control lever. The object is achieved by the subject matter of claim 1. Further advantageous embodiments can be derived from the dependent claims.

According to the method obtained by the invention to transfer vehicle control from automated vehicle control by a control unit to manual vehicle control by a vehicle driver by means of a control lever, at least one actual speed and one actual trajectory of the vehicle as well as a speed based on the actual position of the control lever and a trajectory based on the actual position of the control lever, are graphically displayed on the first display screen. The manually operable control lever is used to at least accelerate, brake and steer the vehicle. There is also at least one first display screen for displaying vehicle information. The transfer from automated vehicle control to manual vehicle control takes place when the actual speed of the vehicle corresponds graphically to the speed based on the actual position of the control lever, and the actual trajectory of the vehicle corresponds graphically to the trajectory based on the actual position of the control lever on the first display screen.

Vehicle control is understood to be at least control of the vehicle in the longitudinal and lateral directions. The acceleration and braking of the vehicle alter the speed of the vehicle in the longitudinal direction. Steering the vehicle sets a steering angle on at least one, preferably two, in particular four, wheels of the vehicle. With a three-wheeled vehicle, for example, only one of the wheels is used to steer the vehicle. Normally, two of the wheels on one axle in a vehicle with two axles and four wheels are used to steer the vehicle. Alternatively, all four wheels can also be used to steer the vehicle, i.e. in vehicles with all-wheel steering, or with a rear axle that can also be steered.

The control lever is a control element used for controlling a vehicle that can be operated manually by a vehicle driver. The vehicle is specifically a passenger vehicle, truck, or utility vehicle. The vehicle is accelerated, braked and steered by the vehicle driver via the control lever. Pedals and a steering wheel are thus obsolete. Furthermore, other functions in the vehicle can also be controlled by means of the control lever, or other control elements that may be available, i.e. for selecting a transmission setting. Other control elements may be, e.g. buttons, switches, touchpads, knobs, etc.

The control lever is preferably located spatially between a driver position and a passenger position in the vehicle, and can be controlled equally from both positions. The driver position and the passenger position are seating locations in the front part of the passenger compartment, wherein the driver position and the passenger position are adjacent to one another laterally. The driver position is normally the position within the passenger compartment of the vehicle closer to the middle of the road. The passenger position, in contrast, is closer to the shoulder of the road.

To operate the control lever, the vehicle driver grabs the control lever with his hand. In particular, the control lever can be in the form of a joystick, such that it can be grasped, at least partially, by the respective hand, or the fingers on the respective hand. The control lever is preferably ergonomic. Control of the vehicle is initiated by moving the control lever. Moving the control lever is understood to be a displacement or twisting of the control lever. In particular, the control lever is functionally connected to the control unit for longitudinal and lateral control of the vehicle, wherein the control unit evaluates the movement signals manually introduced via the control lever, and controls the vehicle therewith.

The invention includes the technical teaching that the control lever contains at least one control element that can be actuated by a vehicle driver's finger. By way of example, the control lever can have one or more buttons and/or switches, or these buttons and/or switches can be located in the immediate proximity of the control lever, via which blinkers, windshield wipers, headlamps, the horn, transmission settings, or the volume of a music system or a navigation system can be controlled.

The first display screen is used to display driving information. The vehicle has preferably two, more preferably three, display screens. Other information can also be displayed on the first display screen, e.g. TV functions, cellphone functions, multimedia content, navigation data, map information, vehicle information, and weather predictions. A least one actual speed and one actual trajectory of the vehicle, as well as a speed based on the actual position of the control lever and a trajectory based on the actual position of the control lever are graphically displayed on the first display screen when initiating the vehicle control transfer from automated vehicle control to manual vehicle control.

The actual speed of the vehicle is the real and current driving speed of the vehicle, wherein the actual trajectory of the vehicle is the real and current trajectory of the vehicle. In comparison, the speed based on the actual position of the control lever can be the real and current driving speed of the vehicle, as long as the actual position, or current position, of the control lever corresponds to the current speed of the vehicle. Likewise, the trajectory based on the actual position of the control lever can be the real and current trajectory of the vehicle as long as the actual position, or current position, of the control lever corresponds to the current trajectory of the vehicle.

Each actuation of the control lever in the manual, i.e. not autonomous, mode, alters the driving state of the vehicle. If the control lever is not actuated, it remains in a neutral position corresponding to an idling state with a steering angle of 0°. When the control lever is in the neutral position, there is neither acceleration nor braking, and no steering angle is set, such that the steerable wheels of the vehicle convey the vehicle in a straight line.

If the control lever is in the neutral position, the actual trajectory and the actual speed of the vehicle are not the same as the speed based on the actual position of the control lever and the trajectory based on the actual position of the control lever. Moreover, the movements of the vehicle and the control lever are not aligned, such that if the vehicle driver were to assume control of the vehicle, dangerous situations could arise. By way of example, transferring vehicle control from automated vehicle control to manual vehicle while the vehicle is passing through a curve in the road could result in a dangerous situation, because the turned wheels and the speed would be altered by a neutral position of the control lever such that the vehicle would move in a straight line, without acceleration, thus driving off the road.

For this reason, according to the invention, transferring vehicle control from automated vehicle control to manual vehicle control first takes place when the actual speed of the vehicle corresponds graphically to the speed based on the actual position of the control lever, and the actual trajectory of the vehicle corresponds graphically to the trajectory based on the actual position of the control lever, on the first display screen. The control lever must therefore be moved from its neutral position by the vehicle driver, such that the actual trajectory and actual speed of the vehicle are the same as the speed based on the actual position of the control lever and the trajectory based on the actual position of the control lever. The alignment of the control lever is therefore altered for this.

Transferring vehicle control is understood to mean that the vehicle that has so far been controlled in an automated or autonomous manner experiences a change in the vehicle control, wherein after the vehicle control has been transferred, and the vehicle driver assumes control of the vehicle by means of the control lever, thus manually accelerating, braking, and steering the vehicle.

The actual speed and actual trajectory of the vehicle are derived by the vehicle driver from the graphic display of the speed based on the actual position of the control lever and the trajectory based on the actual position of the control lever on the first display screen. The actual position of the vehicle is preferably depicted graphically as a grey, or other colored, surface, wherein the trajectory based on the actual position of the control lever comprises two black, or other colored, lines or curves, or driving paths of the steerable wheels. The actual speed of the vehicle and the speed based on the actual position of the control lever are preferably displayed digitally, and therefore as numerals.

The transfer from automated vehicle control to manual vehicle control is preferably confirmed by the vehicle driver. It is therefore intended that the actual speed of the vehicle corresponds to the speed based on the actual position of the control lever, and the actual trajectory of the vehicle corresponds to the trajectory based on the actual position of the control lever on the display screen. There is also a confirmation by the vehicle driver. Both are intended for transferring vehicle control from automated vehicle control to manual vehicle control.

By way of example, transferring vehicle control from automated vehicle control to manual vehicle control is first confirmed by the vehicle driver, and the control lever is subsequently moved such that the actual speed of the vehicle is the same as the speed based on the actual position of the control lever, and the actual trajectory of the vehicle is the same as the trajectory based on the actual position of the control lever.

Alternatively or additionally, it is also conceivable that the control lever is first moved such that the actual speed of the vehicle is the same as the speed based on the actual position of the control lever, and the actual trajectory of the vehicle is the same as the trajectory based on the actual position of the control lever. As a result, the transferring of vehicle control from automated vehicle control to manual vehicle control is confirmed by the vehicle driver.

According to one exemplary embodiment, transferring vehicle control from automated vehicle control to manual vehicle control is confirmed by the driver through actuating a graphic element displayed on the first display screen. In particular, a graphic bar element is shown on the first display screen, wherein sliding the graphic bar element with a finger represents confirmation of the transfer from automated vehicle control to manual vehicle control. Furthermore, the first display screen is a touchscreen, i.e. touch-sensitive screen, which can be operated by touching parts of the display thereon.

According to another exemplary embodiment, the vehicle driver's confirmation of the transfer from automated vehicle control to manual vehicle control is obtained through actuating a control element on the control lever. This means that there is a button, wheel, or switch on the control lever, wherein automated vehicle control is transferred to manual vehicle control when the wheel or switch is actuated.

Furthermore, transfer from automated vehicle control to manual vehicle control is confirmed by the vehicle driver by a voice command from the vehicle driver. In particular, the control unit is configured to receive voice commands and implement them.

Automated vehicle control is preferably transferred to manual vehicle control if the actual speed of the vehicle corresponds to the speed based on the actual position of the control lever and the actual trajectory of the vehicle corresponds to the trajectory based on the actual position of the control lever lasts for at least one second to at most ten seconds, preferably two to five seconds, in particular three seconds.

A counter is preferably used to graphically display a transfer point from automatic vehicle control to manual vehicle control while the actual speed of the vehicle is the same as the speed based on the actual speed of the control lever, and the actual trajectory of the vehicle is the same as the trajectory based on the actual position of the control lever on the first display screen. The counter can be in the form of a graphic element, e.g. a circle or doughnut that fills up over time. Alternatively or additionally, a countdown depicted with numerals can be displayed on the first display screen.

According to one embodiment, if the actual speed of the vehicle is the same as the speed based on the actual position of the control lever, and the actual trajectory of the vehicle is the same as the trajectory based on the actual position of the control lever, an acoustic feedback is output. This acoustic feedback informs the driver that the actual speed of the vehicle corresponds to the speed based on the actual position of the control lever, and the actual trajectory of the vehicle corresponds to the trajectory based on the actual position of the control lever.

Preferably, if the actual speed of the vehicle is the same as the speed based on the actual position of the control lever, and the actual trajectory of the vehicle is the same as the trajectory based on the actual position of the control lever, a haptic feedback is output at the control lever. By way of example, a vibrator is located on the control lever, which outputs the haptic feedback.

The invention includes the technical teachings that there is at least one second display screen for displaying information, wherein the information displayed on the second display screen is aligned with the information displayed on the first display screen. In other words, the display screens are functionally connected to one another and to the control unit, wherein the control unit is configured to control the displays on the respective display screens. In particular, the display on the first display screen changes when initiating the transfer from automated vehicle control to manual vehicle control. The display on the second display screen also changes, simultaneously.

The invention also relates to a vehicle, comprising a control unit, a control lever, and at least one first display screen, wherein the vehicle can be controlled in an automated manner by the control unit, wherein the vehicle can also be controlled manually by a vehicle driver via the control lever, and wherein at least driving information relevant to control of the vehicle can be displayed on the first display screen, wherein the vehicle can be controlled according to a method described by the invention.

Figure 2:
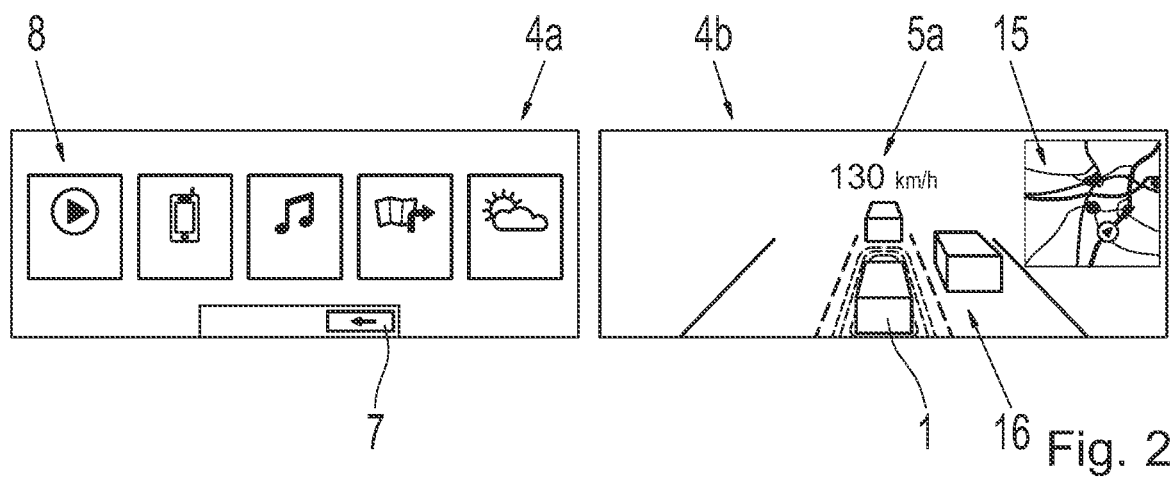
Figure 3:
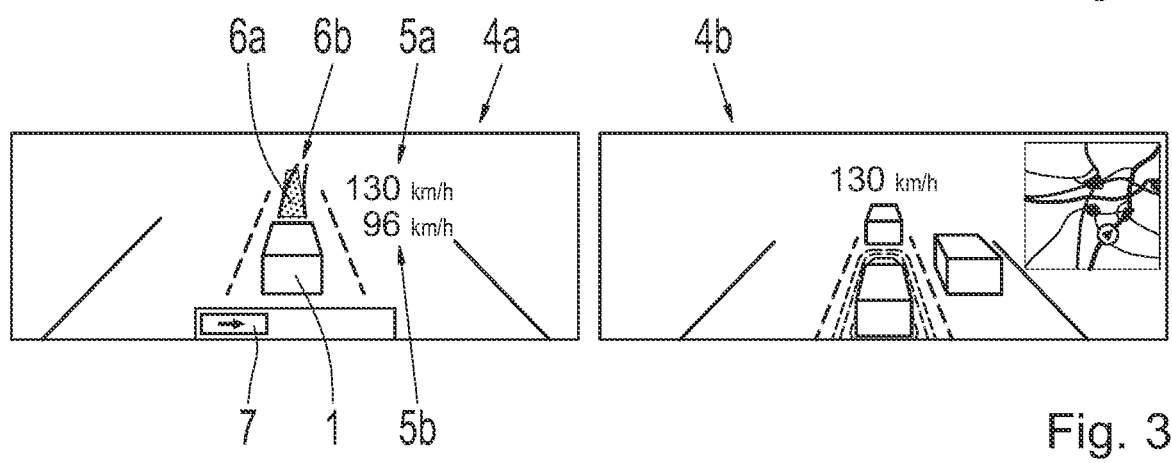

A preferred exemplary embodiment of the invention shall be explained in greater detail below, based on the figures, wherein the same or similar elements have the same reference symbols. Therein:

FIG. 1 shows a schematic as well as partially transparent top view of a vehicle, which can be controlled according to a method described by the invention, FIG. 2 shows a schematic illustration of a cockpit in the vehicle shown in FIG. 1, equipped with two display screens, wherein the vehicle is controlled automatically, FIG. 3 shows a schematic illustration of the cockpit shown in FIG. 2, equipped with two display screens, wherein the vehicle is controlled automatically, and the vehicle driver has initiated a transfer from the automated vehicle control to manual vehicle control, FIG. 4 shows a schematic illustration of the cockpit shown in FIGS. 2 and 3, equipped with two display screens, wherein the vehicle is controlled automatically, and transfer from the automated vehicle control to manual vehicle control is about to occur, and FIG. 5 shows a schematic illustration of the cockpit shown in FIGS. 2 to 4, equipped with two display screens, wherein the vehicle is controlled manually.

A vehicle 1 is shown in FIG. 1 that has a control unit 2, control lever 3, and a first and second display screen 4a, 4b. The vehicle 1 can be controlled in an automated manner by the control unit 2, and can therefore drive autonomously. Furthermore, the vehicle 1 can be controlled manually by a vehicle driver—not shown herein—via the control lever.

The vehicle 1 has a first and second axle 10a, 10b, wherein two wheels 11a, 11b, and 11c, 11d are placed on each axle 10a, 10b. The first and second wheels 11a, 11b on the first axle 10a can be steered, i.e. turned. The third and fourth wheels 11c, 11d on the second axle 10b cannot be steered, i.e. they cannot be turned. Two seats 12a, 12b are located in the front of the passenger compartment in the vehicle 1, and a bench seat 13 is located in the rear. The control lever 3 is located spatially between the two seats 12a, 12b, in particular in the middle. In the present example, the control lever 3 is located on a longitudinal axis 14 through the vehicle 1. The control lever 3 can be equally operated from both seats 12a, 12b to control the vehicle 1. The control lever 3 is operated from the first seat 12a with the right hand, and with the left hand from the second seat 12b.

The first display screen 4a is located in front of the first seat 12a and the second display screen is located in front of the control lever 3, and thus also on the longitudinal axis 14 of the vehicle 1. In addition, but not shown herein, a third display screen can be placed in front of the second seat 12b. The two display screens 4a, 4b are touchscreens, or touch-sensitive screens, in the present example, and are used to display driving information to a vehicle driver, e.g. vehicle speed, vehicle notifications, navigation information, weather data, and multimedia content. The display of the content on the respective display screen 4a, 4b depends on the respective active vehicle control.

The cockpit of the vehicle 1 shown in FIG. 1 is shown in an abstracted form in FIGS. 2 to 5, wherein only the two display screens 4a, 4b are relevant and therefore shown.

According to FIG. 2, the vehicle is in the autonomous driving mode. The vehicle 1 is therefore controlled in the automated vehicle control mode by the control unit 2. In other words, the control unit 2 controls the vehicle 1 longitudinally and laterally, and therefore accelerates, brakes, and steers the vehicle 1. The vehicle driver sitting in the first seat 12a can select different information fields 8 on the first display screen 4a. A map 15, perspective camera image 16 of the abstracted vehicle 1, and an actual speed 5a, i.e. the current speed of the vehicle 1, are shown on the second display screen 4b. The actual speed 5a of the vehicle in this example is 130 km/h. Furthermore, a graphic element 7 is shown in the lower portion of the first display screen 4a, which initiates the transfer from automated vehicle control to manual vehicle control when confirmed by the driver, in the present example through swiping left.

The vehicle driver has already initiated the transfer from automated vehicle control to manual vehicle control in FIG. 3, wherein the vehicle 1 is still controlled automatically by the control unit 2. When the manual vehicle control is initiated, the actual speed 5a and an actual trajectory 6a of the vehicle 1, and a speed 5b based on the actual position of the control lever 3 and a trajectory 6b based on the actual position of the control lever 3 are shown on the first display screen 4a. The actual speed 5a of the vehicle is 130 km/h, wherein the control lever 3 has already been moved by the vehicle driver, such that the speed 5b based on the actual position of the control lever 3 is 96 km/h. The actual trajectory 6a of the vehicle 1 is indicated by a grey surface in the present example, and the trajectory 6b based on the actual position of the control lever 3 is indicated by two curved lines. Furthermore, a graphic element 7 shown in the lower portion of the first display screen 4a, by means of which transferring vehicle control from automated vehicle control to manual vehicle control is interrupted when confirmed by the vehicle driver by swiping right in the present example, and thus returning the display to that in FIG. 2 on the second display screen 4b. The display on the second display screen 4b remains unchanged with respect to FIG. 2.

According to FIG. 4, the vehicle driver has moved the control lever 3 such that the actual speed 5a of the vehicle 1 becomes graphically the same as the speed 5b based on the actual position of the control lever 3, and the actual trajectory 6a of the vehicle becomes graphically the same as the trajectory 6b based on the actual position of the control lever 3. The transfer from automated vehicle control to manual vehicle control by the vehicle driver is initiated in 3 seconds, once the speed and trajectory are aligned properly. For this, a counter 9 displaying the point of transfer from automated vehicle control to manual vehicle control is inserted in an upper portion of the first display screen 4a. Furthermore, a graphic element 7 is shown in a lower portion of the first display screen 4a, by means of which transferring vehicle control from automated vehicle control to manual vehicle control is interrupted when confirmed by the vehicle driver by swiping right in the present example, and thus returning the display to that in FIG. 2 on the second display screen 4b. The display on the second display screen 4b remains unchanged with respect to FIG. 2.

In FIG. 5, the vehicle driver has assumed control of the vehicle, and controls the vehicle 1 manually via the control lever 3. An actual speed 5a of the vehicle is shown in the middle of the first display screen 4a, which is the same as the speed 5b based on the actual position of the control lever 3 when the vehicle driver controls the vehicle manually. The map 15 is shown in a right-hand portion of the first display screen 4a. Furthermore, a graphic element 7 is shown in a lower portion of the first display screen 4a, which initiates the transfer of vehicle control from manual vehicle control to automated vehicle control by the control unit when confirmed by the vehicle driver by swiping right in the present case, and thus returning the display to that in FIG. 2 on the second display screen 4b. The information display on the second display screen 4b is adapted according to the information display on the first display screen 4a. The vehicle 1, including the trajectory 6b based on the actual position of the control lever 3, which is the same as the actual trajectory 5b of the vehicle 1, is shown in an abstract manner on the second display screen 4b.

REFERENCE SYMBOLS 1 vehicle
2 control unit
3 control lever
4a first display screen
4b second display screen
5a actual speed of the vehicle
5b speed based on the actual position of the control lever
6a actual trajectory of the vehicle
6b trajectory based on the actual position of the control lever
7 graphic element
8 information field
9 counter
10a first axle
10b second axle
11a first wheel
11b second wheel
11c third wheel
11d fourth wheel
12a first seat
12b second seat
13 bench seat
14 longitudinal axis of the vehicle
15 map
16 camera image

The invention claimed is:

1. A method for transferring control of a vehicle from automated vehicle control by a control unit to manual vehicle control by a vehicle driver by means of a manually operable control lever, wherein the manually operable control lever is used at least for accelerating, braking, and steering the vehicle, and there is at least one first display screen for displaying driving information, wherein the method comprises:

displaying graphically on the first display screen at least an actual speed and an actual trajectory of the vehicle and a speed based on an actual position of the control lever and a trajectory based on the actual position of the control lever; and transferring automated vehicle control to manual vehicle control when the actual speed of the vehicle corresponds graphically to the speed based on the actual position of the control lever and the actual trajectory of the vehicle corresponds graphically to the trajectory based on the actual position of the control lever on the first display screen.

2. The method according to claim 1, further comprising confirming the transfer from automated vehicle control to manual vehicle control by the vehicle driver.

3. The method according to claim 1, further comprising receiving a confirmation from the vehicle driver of transferring from automated vehicle control to manual vehicle control through actuation of a graphic element on the first display screen.

4. The method according to claim 1, further comprising receiving a confirmation from the vehicle driver of transferring from automated vehicle control to manual vehicle control through actuation of a control element on the control lever.

5. The method according to claim 1, further comprising receiving a confirmation from the vehicle driver of transferring from automated vehicle control to manual vehicle control through receiving a voice command from the vehicle driver.

6. The method according to claim 1, further comprising transferring vehicle control from automated vehicle control to manual vehicle control when the actual speed of the vehicle is the same as the speed based on the actual speed of the control lever and the actual trajectory of the vehicle is the same as the trajectory based on the actual position of the control lever for at least one to ten seconds.

7. The method according to claim 6, further comprising displaying on the first display screen a counter that displays a point of transfer from automated vehicle control to manual vehicle control when the actual speed of the vehicle is the same as the speed based on the actual position of the control lever and the actual trajectory of the vehicle is the same as the trajectory based on the actual position of the control lever.

8. The method according to claim 1, further comprising outputting an acoustic feedback is output when the actual speed of the vehicle is the same as the speed based on the actual position of the control lever and the actual trajectory of the vehicle is the same as the trajectory based on the actual position of the control lever.

9. The method according to claim 1, further comprising outputting a haptic feedback at the control lever when the actual speed of the vehicle is the same as the speed based on the actual position of the control lever and the actual trajectory of the vehicle is the same as the trajectory based on the actual position of the control lever.

10. The method according to claim 1, wherein the vehicle further includes at least one second display screen, wherein the method further comprises displaying information display on the second display screen that is adapted according to the information display on the first display screen.

11. A vehicle, comprising:
- a control unit configured to automatically control the vehicle;
- a control lever coupled to the control unit and configured to allow a vehicle driver to manually control the vehicle via the control lever; and
- at least a first display screen coupled to the control unit, wherein the control unit is configured to:
  - display graphically on the first display screen at least an actual speed and an actual trajectory of the vehicle and a speed based on an actual position of the control lever and a trajectory based on the actual position of the control lever; and
  - transfer automated vehicle control to manual vehicle control when the actual speed of the vehicle corresponds graphically to the speed based on the actual position of the control lever and the actual trajectory of the vehicle corresponds graphically to the trajectory based on the actual position of the control lever on the first display screen.

12. The vehicle according to claim 11, wherein the control unit is further configured to receive a confirmation from the vehicle driver of the transfer from automated vehicle control to manual vehicle control.

13. The vehicle according to claim 11, wherein the control unit is further configured to receive a confirmation from the vehicle driver of the transfer from automated vehicle control to manual vehicle control by receiving an actuation of a graphic element on the first display screen.

14. The vehicle according to claim 11, wherein the control lever further comprises at least one control element, and wherein the control unit is further configured to receive a confirmation from the vehicle driver of the transfer from automated vehicle control to manual vehicle control by receiving an actuation of the control element on the control lever.

15. The vehicle according to claim 11, wherein the control unit is further configured to receive a confirmation from the vehicle driver of the transfer from automated vehicle control to manual vehicle control by receiving a voice command from the vehicle driver.

16. The vehicle according to claim 11, wherein the control unit is further configured to transfer vehicle control from automated vehicle control to manual vehicle control when the actual speed of the vehicle is the same as the speed based on the actual speed of the control lever and the actual trajectory of the vehicle is the same as the trajectory based on the actual position of the control lever for one to ten seconds.

17. The vehicle according to claim 16, wherein the control unit is further configured to display on the first display screen a counter that displays a point of transfer from automated vehicle control to manual vehicle control when the actual speed of the vehicle is the same as the speed based on the actual position of the control lever and the actual trajectory of the vehicle is the same as the trajectory based on the actual position of the control lever.

18. The vehicle according to claim 11, wherein the control unit is further configured to cause an output of an acoustic feedback when the actual speed of the vehicle is the same as the speed based on the actual position of the control lever and the actual trajectory of the vehicle is the same as the trajectory based on the actual position of the control lever.

19. The vehicle according to claim 11, wherein the control unit is further configured to cause an output of a haptic feedback at the control lever when the actual speed of the vehicle is the same as the speed based on the actual position of the control lever and the actual trajectory of the vehicle is the same as the trajectory based on the actual position of the control lever.

20. The vehicle according to claim 11, wherein the vehicle further includes at least one second display screen, and
- wherein the control unit is further configured to display information on the second display screen and adapt the information displayed on the second display screen according to the information displayed on the first display screen.

* * * * *